United States Patent
Novikov et al.

(10) Patent No.: US 11,877,073 B2
(45) Date of Patent: Jan. 16, 2024

(54) SYSTEM, DEVICES AND/OR PROCESSES FOR PROCESSING INFRARED PIXEL VALUES

(71) Applicant: Arm Limited, Cambridge (GB)

(72) Inventors: Maxim Novikov, Manchester (GB); David Hanwell, Sale (GB); Puneet Singh Matharu, Rhyl (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/674,741

(22) Filed: Feb. 17, 2022

(65) Prior Publication Data

US 2023/0116000 A1    Apr. 13, 2023

Related U.S. Application Data

(60) Provisional application No. 63/253,778, filed on Oct. 8, 2021.

(51) Int. Cl.
*H04N 23/84* (2023.01)
*H04N 25/13* (2023.01)
*H04N 25/131* (2023.01)

(52) U.S. Cl.
CPC ......... *H04N 23/843* (2023.01); *H04N 25/131* (2023.01); *H04N 25/134* (2023.01)

(58) Field of Classification Search
CPC ... H04N 23/843; H04N 25/131; H04N 25/134
See application file for complete search history.

(56) References Cited

U.S. PATENT DOCUMENTS

2017/0134704 A1* 5/2017 Otsubo .................. G02B 5/20

FOREIGN PATENT DOCUMENTS

| JP | 2017118283 A | 6/2017 |
| KR | 20170079290 A | 7/2017 |

OTHER PUBLICATIONS

Mildenhall, et al, "Burst Denoising with Kernel Prediction Networks," this CVPR paper is the Open Access version, provided but the Computer Vision Foundation, except for watermark, it is identical to the version available on IEEE Xplore, 2018, 9 pages.
Shi, et al, "Real-Time Single Image and Video Super-Resolution Using an Efficient Sub-Pixel Convolutional Neural Network," arXiv:1609.05158v2 [cs.CV], Sep. 23, 2016, 10 pages.
Extended European Search Report, App. No. EP22198649.0, dated Mar. 3, 2023, 8 pages.

* cited by examiner

*Primary Examiner* — Yogesh K Aggarwal
(74) *Attorney, Agent, or Firm* — Berkeley Law & Technology Group, LLP (57) ABSTRACT

Example methods, apparatuses, and/or articles of manufacture are disclosed that may be implemented, in whole or in part, techniques to process pixel values sampled from a multi color channel imaging device. In particular, methods and/or techniques to process pixel samples for non-visible light from pixels allocated to detection of infrared light are disclosed.

18 Claims, 9 Drawing Sheets

SYSTEM, DEVICES AND/OR PROCESSES FOR PROCESSING INFRARED PIXEL VALUES

This application claims the benefit of priority to U.S. Provisional patent application Ser. No. 63/253,778 titled "SYSTEM, DEVICES AND/OR PROCESSES FOR PROCESSING INFRARED PIXEL VALUES," filed on Oct. 8, 2021, assigned to the assignee of claimed subject matter, and incorporated herein by reference in its entirety.

BACKGROUND

1. Field

The present disclosure relates generally to image processing devices.

2. Information

An imaging device formed on or in combination with an integrated circuit device typically includes an array of pixels formed by filters disposed over photo detectors (e.g., photo diodes formed in a complementary metal oxide semiconductor device) in a Bayer pattern. Such a Bayer pattern typically implements three color channels for red, blue and green visible light. Imaging devices based on a Bayer pattern pixel array have been modified to include a fourth color channel for non-visible infrared light to enable particular night imaging applications.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment, and/or the like means that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. In general, of course, as has always been the case for the specification of a patent application, these and other issues have a potential to vary in a particular context of usage. In other words, throughout the disclosure, particular context of description and/or usage provides helpful guidance regarding reasonable inferences to be drawn; however, likewise, "in this context" in general without further qualification refers at least to the context of the present patent application.

In some implementations, an image signal processor (ISP) may be designed to process signals in 2×2 repeating patterns—such as the 2×2 RGGB Bayer pattern and 2×2 RGBIr patterns. Blocks in such an ISP may rely on a pattern repeating every two pixels and may be unable to process pixel values in a 4×4 RGBIr pattern (e.g., as in FIG. 1A). According to an embodiment, a 4×4 RGBIr signal pattern may be remosaiced into a 2×2 Bayer pattern (e.g., as in FIG. 1B) to include IR-corrected pixel values. While pixels of a green channel may themselves be present at same locations, a remosaic block may nonetheless include modification so that green pixel values account for infrared contributions.

Particular embodiments described herein are directed to, among other things, a 4×4 RGBIR to 2×2 Bayer remosaic operation, proportional infrared correction, proportional clipping management, an improved technique for infrared interpolation, blurring of infrared pixel values prior to application of infrared correction.

Figure 1A:
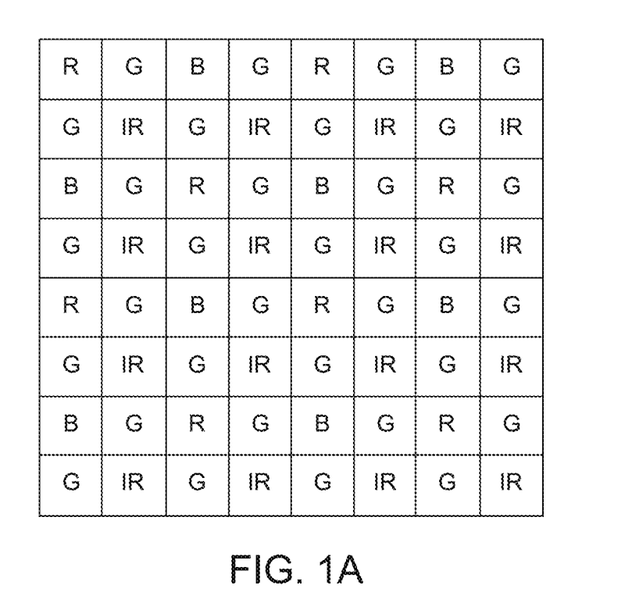
FIG. 1A is a schematic diagram of an imaging device that defines four color channels including an infrared channel according to an embodiment.
Figure 1B:
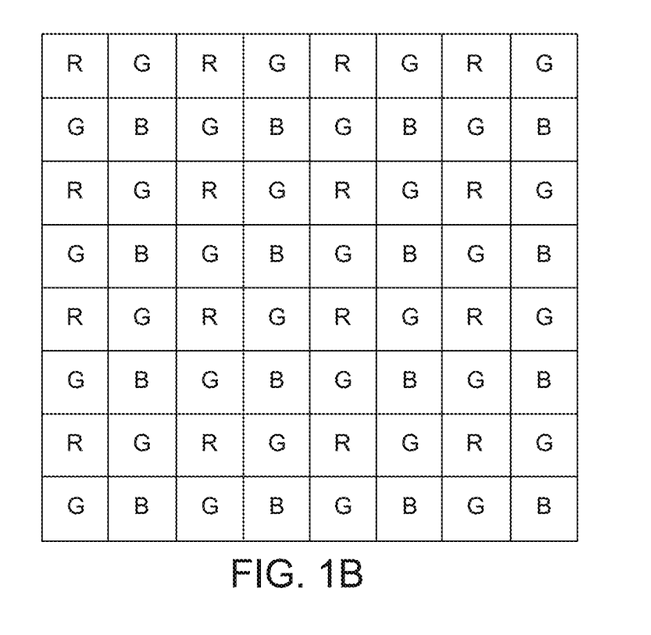
FIG. 1B is a schematic diagram of an imaging device that defines three color channels in a so-called Bayer, according to an embodiment.

Imaging devices formed in integrated circuit devices may include a substrate formed as a complementary metal oxide semiconductor (CMOS) device having formed thereon an array of photodiodes that are responsive to impinging light energy. In one embodiment as shown in FIG. 1B, light filters or "masks" may be formed over such photodiodes to form red, blue and green pixels of a so-called Bayer pattern pixel array. In an embodiment, energy collected at such photodiodes may be sampled as voltage and/or current samples that express and/or represent an intensity of light of particular color frequency bands at particular pixel locations over an exposure interval (e.g., frame).

Sensitivity of such a three-color channel imaging device may be limited to detection of visible light in red, blue and green bands. Accordingly, such a three-color channel imaging device may have limited effectiveness in night and/or low lit environments. According to an embodiment, a Bayer pattern imaging device may be modified to include pixels dedicated to detection of infrared light to implement a fourth color channel of invisible light energy as shown in FIG. 1A. Such an imaging device may comprise any one of a number of commercially available imaging devices such as, for example, the Omnivision OV4682 having a 2×2 RGBIr pattern, Omnivision OV2744 or OnSemi AR0237 having a 4×4 RGBIr pattern. In a particular implementation, pixel energy detected in these four color channels for red, blue, green and infrared pixels may be processed in such a manner to support imaging based on visible light as well as to support applications that employ infrared detection in non-visible bands. In one particular example, image pixel samples obtained from a four-color channel pixel array (e.g., as shown in FIG. 1A) may be transformed to express image pixel samples in an arrangement according to a three-channel Bayer pattern. This may enable use of legacy processing techniques to process image pixel samples obtained from a four-color channel pixel array for visible light imaging.

Figure 9A:
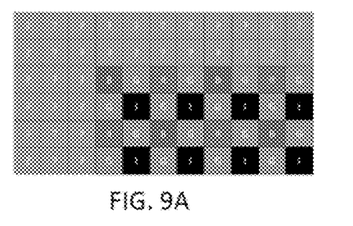
FIGS. 9A through 9G depict a processing of image signal values at edges of an image frame according to an embodiment.
Figure 9B:
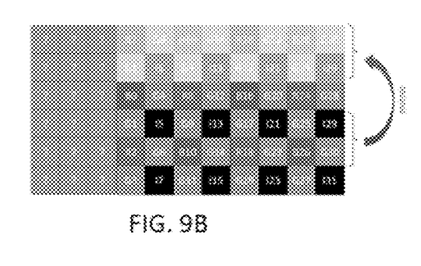
Figure 9C:
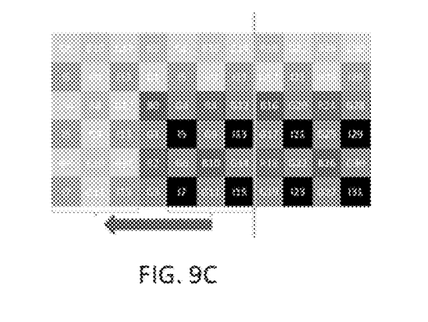
Figure 9D:
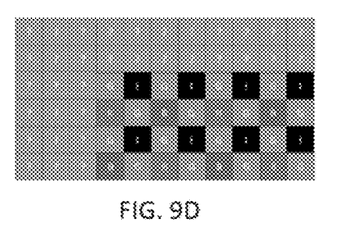
Figure 9E:
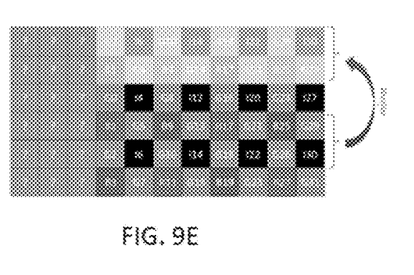

According to an embodiment, some imaging processing operations performed on image signal values generated from at a pixel array shown in FIG. 1A may employ pixel values that fall outside of the pixel array (e.g., as applied close to edges of an image frame). FIGS. 9A through 9G illustrate operations to fill missing image signal values at edges of an image frame according to an embodiment. In a particular implementation, operations illustrated in FIGS. 9A through 9G may be performed prior to additional image processing operations shown in FIGS. 2, for example. FIG. 9A shows generated image signal intensity values missing two rows at a top edge and three rows at a side edge. As shown in FIG. 9B, two missing top rows are filled by mirroring values in fourth and fifth rows from the top. FIG. 9C then shows copying of pixel values in fifth, sixth and seventh columns from the right in FIG. 9B to fill first, second and third columns.

Figure 9F:
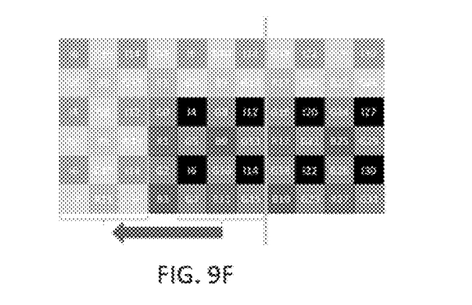
Figure 9G:
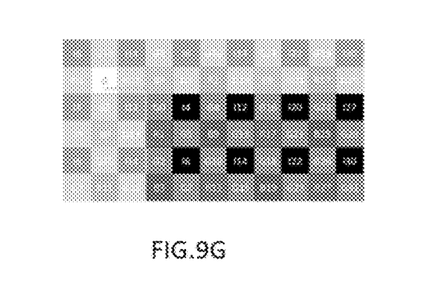

In the particular embodiment of FIG. 9A, the third row from the top (the first row of usable pixel values) has a sequence of red, blue and green pixel values as B/G/R/G/B . . . . In the particular embodiment of FIG. 9D, on the other hand, the third row from the top (the first row of usable pixel values) has a sequence of green and infrared (IR) as G/IR/G/IR/G . . . . While operations shown in FIGS. 9B and 9C may be similarly applied to pixel values shown in FIG. 9D (as operations shown in FIGS. 9E and 9F), pixel values in columns do not align with the original pattern. For example, a second column from the left in FIG. 9F is G/B/G/B/G/R instead of the original pattern G/R/G/B/G/R. Thus, in the particular embodiment of FIG. 9D, additional operations may be performed as illustrated in FIG. 9G to shift pixel values in the second row to the right by two pixel positions to provide a resulting pattern with edge-filled pixels conforming to an original pattern shown in FIG. 9D.

Figure 2A:
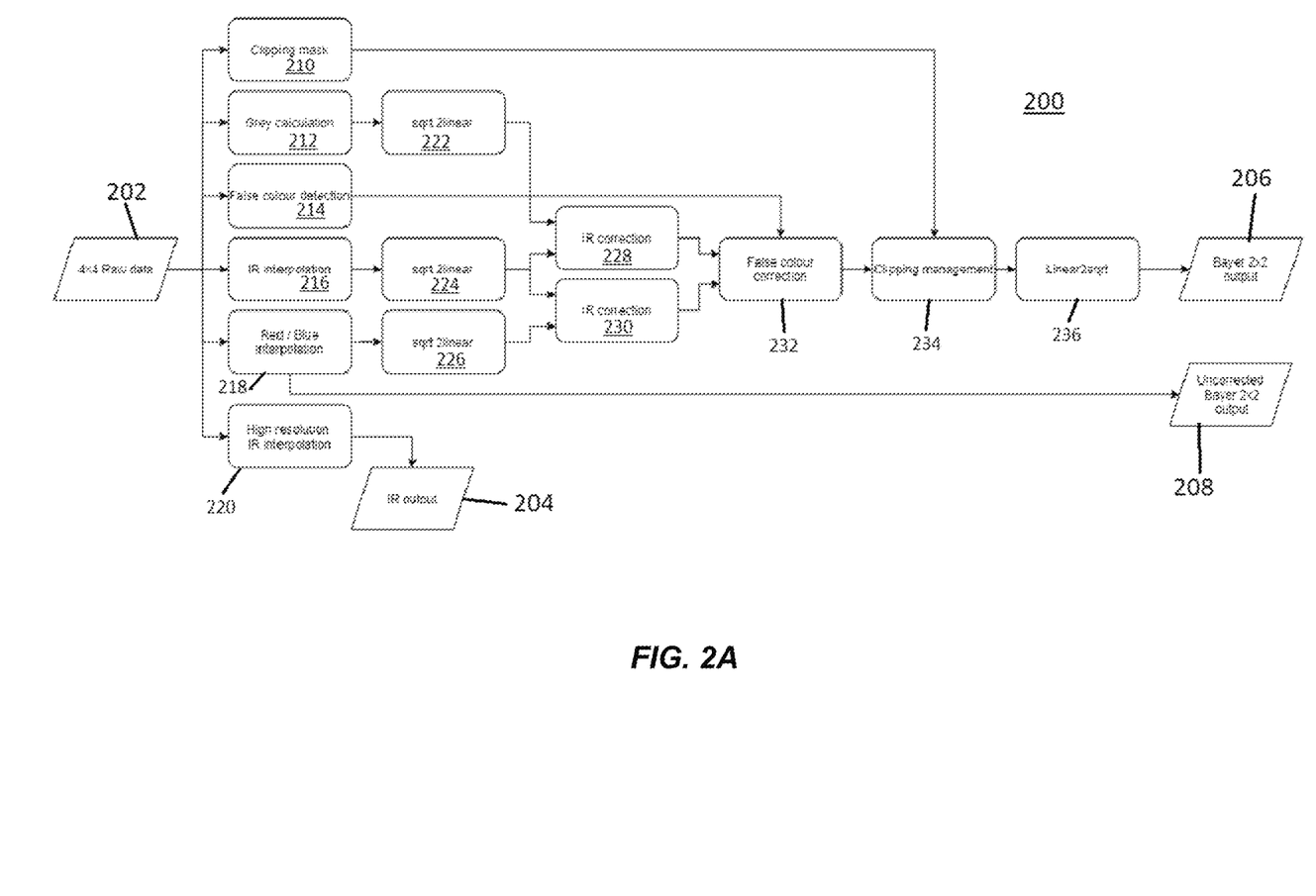
FIG. 2A is a schematic diagram of a system to process raw pixel values sampled from an imaging device that defines four color channels including an infrared channel according to an embodiment.
Figure 2B:
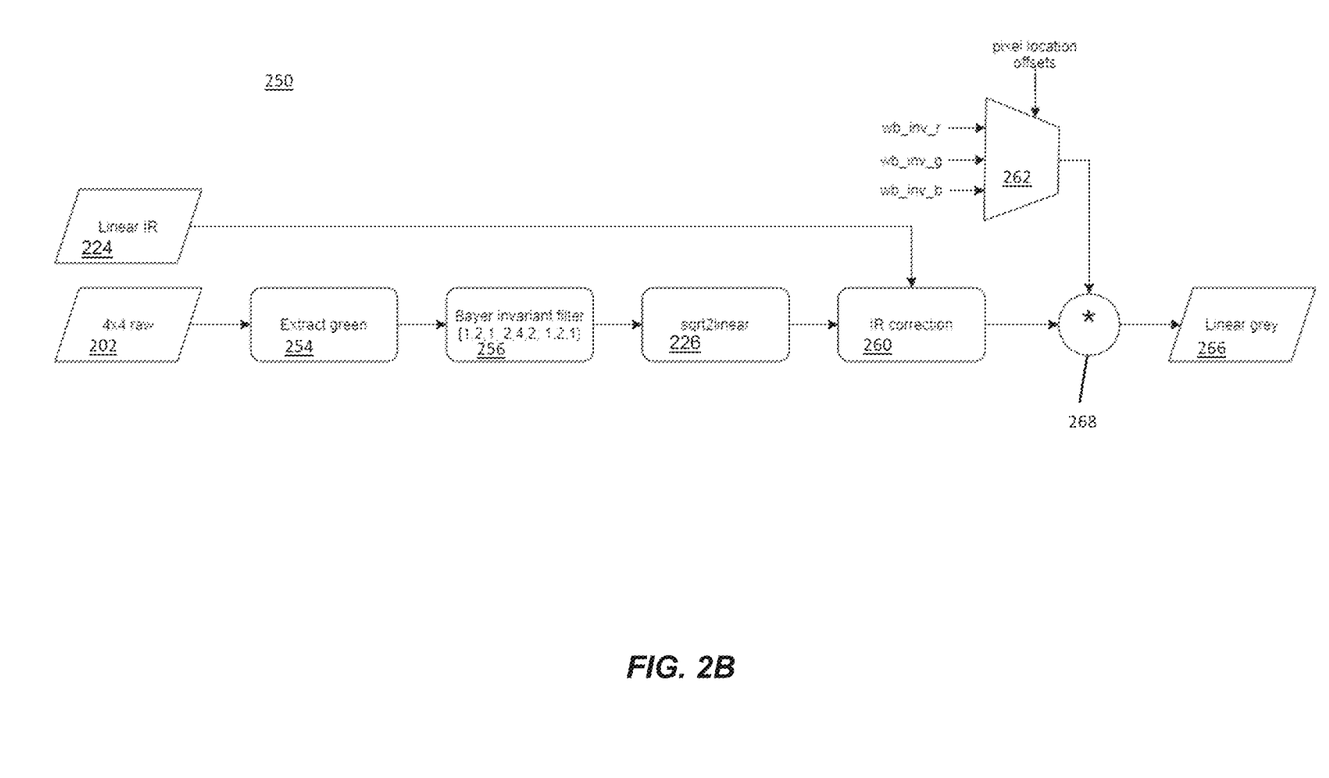
FIG. 2B is a schematic diagram of a process to compute a grey component of an image according to an embodiment.

FIG. 2A is a schematic diagram of a system 200 to process raw pixel values sampled from an imaging device that defines four color channels including an infrared channel according to an embodiment. In one aspect, system 200 may perform color interpolation, infrared pixel value interpolation and/or clipping management. In a particular implementation, features of system 200 may be implemented, in whole or in part, on an integrated circuit device. Such an integrated circuit device may also include and/or be integrated with an imaging device (not shown) to provide image pixel samples for four color channels such as illustrated in FIG. 1A, for example. Raw data 202 may supply as input signals as image pixel samples obtained from a four-color channel imaging device (e.g., as shown in FIG. 1A). As output signals, system 200 may provide Bayer 2×2 output 206, uncorrected Bayer 2×2 output 208, and IR output 204. According to an embodiment, Bayer 2×2 output 206 and/or uncorrected Bayer 2×2 output 208 may be formatted for processing using legacy methods and/or techniques for processing image pixels values generated by a three-color channel imaging device.

According to an embodiment, accuracy and/or usefulness of Bayer 2×2 output 206 and/or IR output 204 may be enhanced with application of interpolation and/or correction techniques. In one aspect as described herein, features of such interpolation and/or correction techniques may be implemented in circuitry of system 200 that occupies only a small portion of transistors implementing system 200.

According to an embodiment, a process to remosaic to a 2×2 Bayer pattern may employ location-dependent kernels to interpolate missing pixel values. In a particular implementation, an interpolation method performed by IR interpolation 216 and/or red/blue interpolation 218 may include, for example, detecting direction in multiple possible directions (e.g. vertical/horizontal and diagonal), interpolating in specific directions determining a strongest direction detection response and strongest neighbor response, blending between strongest response and its neighbor and/or blending between isotropic interpolation and resulting directional interpolation. If a strongest direction detection response is almost the same as a strongest neighbor response, for example, blending may be performed at a 50:50 ratio. If a strongest direction detection response is significantly larger than a strongest neighbor response, blending may be weighted accordingly to enable smooth transitions with a limited number of directions.

According to an embodiment, false color correction 232 may blend a grey component of an image with interpolated pixel values corrected for an infrared contribution. Such a grey component may be computed as linear grey 266, at least in part, according to process 250 shown in FIG. 2B. In the particular implementation of process 250, a grey component of raw data 202 may be computed and/or isolated by processing at block 254 to extract a green component, followed by application of a Bayer invariant filter at block 256. It should be understood, however, that this is merely an example of how a grey component may be computed and/or isolated, and claimed subject matter is not limited in this respect. Here, weights based on inverse white balance coefficients may be applied to an output of IR correction 260 to provide a linearized grey output 266. For example, inverse white balance weights wb_inv_r, wb_inv_g and wb_inv_b may be stored in an array (not shown) and selected at multiplexer 262 for application to IR corrected red or blue pixel values provided by IR correction 260.

Figure 3:
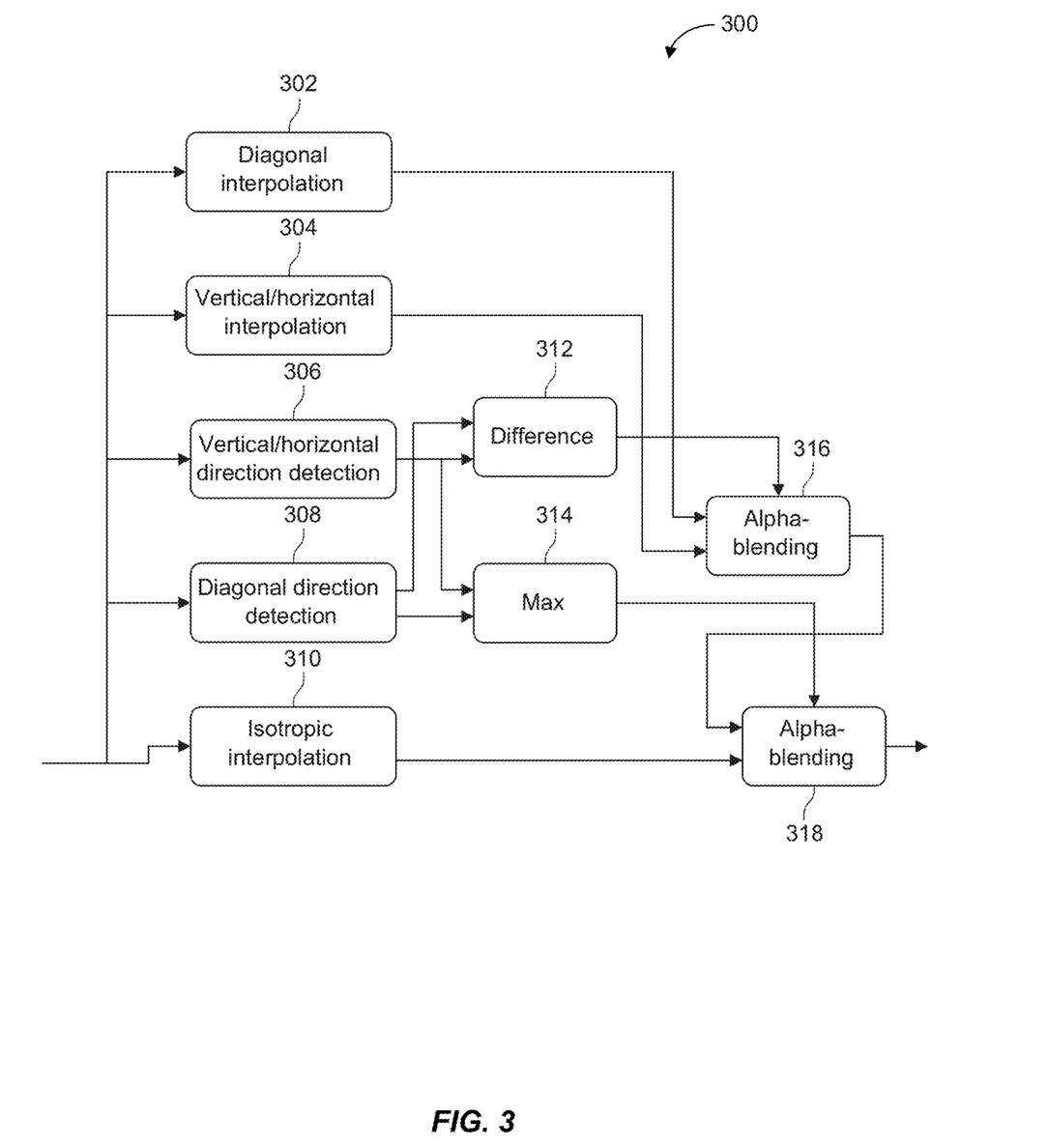
FIG. 3 is a schematic diagram of a system to implement a kernel to interpolate pixel values of an image, according to an embodiment.
Figure 4:
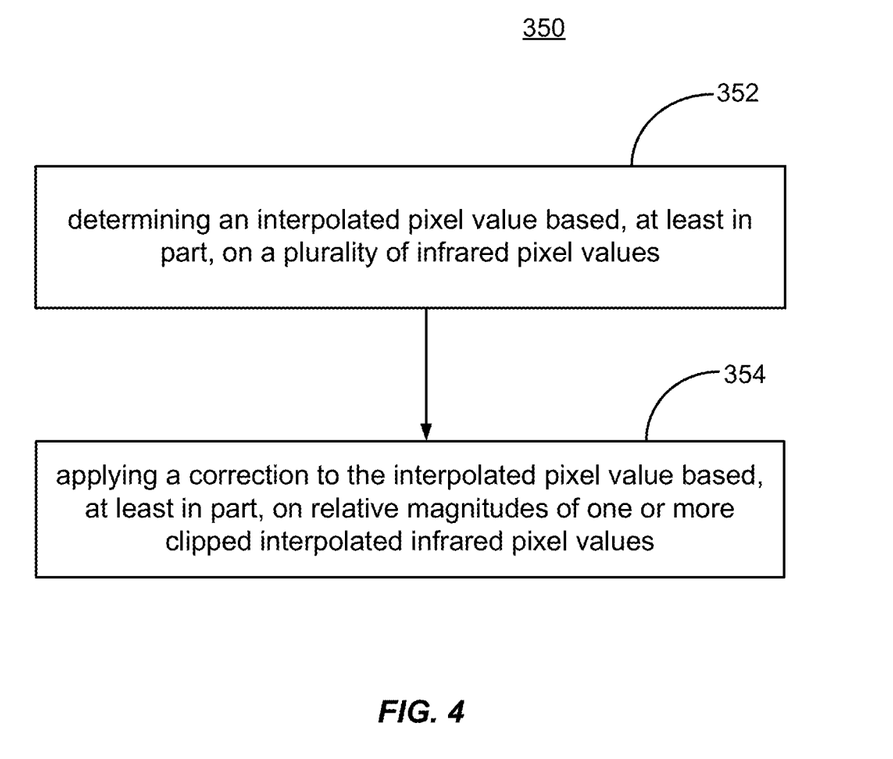
FIG. 4 is a flow diagram of a process to apply a correction to an interpolated pixel value, according to an embodiment.

Another particular implementation of an interpolation technique that may be performed by IR interpolation 216 and/or red/blue interpolation 218 is shown in system 300. FIG. 3 is a schematic diagram of a system 300 to provide an example implementation of a technique at least a portion of IR interpolation 216 and/or red/blue interpolation 218. FIG. 4 is a flow diagram of a process 350 to apply a correction to pixel value interpolated based on infrared pixel values. In a particular implementation, block 352 may perform an interpolation of a blue or red pixel value such as at block 218. According to an embodiment, IR correction 228 and/or IR correction 230 may apply corrections to interpolated red and blue interpolated pixel values (provided by red/blue interpolation 218) based, at least in part, on interpolated infrared (IR) pixel values (provided by IR interpolation 216).

In this context, a "pixel value" as referred to herein means a value and/or parameter that represents an intensity level associated with a particular location of a pixel in an image. Such a pixel value may be associated with a particular light channel such as, for example, infrared light or visible light (e.g., red, blue or green light). In a particular implementation, a pixel value associated with a particular light channel may be expressed in a particular vector and/or data structure along with other pixel values associated with a particular pixel location in an image.

According to an embodiment, image pixels formed in an imaging device may have a limited dynamic range in that energy collected over an exposure interval may saturate physical photodetectors (e.g., formed as photodiodes). As such, red and blue interpolated pixel values may be limited to a maximum value (e.g., due to photodetector saturation) and therefore be "clipped" to such a maximum value if an actual pixel value exceeds the maximum value. Even if a pixel value of a particular pixel does not exceed such a maximum pixel value (e.g., is not clipped), such a pixel value may be interpolated based, at least in part, on pixel values that are clipped.

According to an embodiment, IR correction 228 and/or IR correction 230 may apply a correction at block 354 to an interpolated red or blue pixel value based, at least in part, on interpolated infrared pixel values. Such a correction may comprise a subtraction of a correction value from an uncorrected, interpolated red or blue pixel value. In a particular implementation, such a correction value to be subtracted from such an interpolated red or blue pixel value may be computed based, least in part, on a relative weight of clipped infrared pixel values. For example, such a correction value (to be subtracted from an uncorrected, interpolated red or blue pixel value) may be reduced according to a relative weight of magnitudes of clipped infrared pixel values that are employed in a process to interpolate a red or blue pixel value. In a particular implementation, infrared pixel values applied to determine such an interpolated red or blue pixel value may be "blurred" prior to use in computation of a correction value to be subtracted. This may, for example, reduce resulting artifacts and/or improve overall image quality.

According to an embodiment, IR correction 228 and/or 230 may compute a correction value based, at least in part, on values defining a clipping mask and interpolation coefficients. Such a correction value may be computed, for example, according to expression (1) as follows:

$$\text{Correction} = 1 - \text{conv}(\text{clipping mask}, \text{interpolation coefficients}), \quad (1)$$

where:
clipping_mask is a matrix of values indicating a degree to which a pixel has been clipped; and
interpolation_coefficients is a matrix of values representing values in a kernel.

In a particular numerical example below, $$InterpolationKernel = \begin{bmatrix} 1 & 0 & 0 & 0 & 1 \\ 0 & 0 & 0 & 0 & 0 \\ 0 & 0 & 0 & 0 & 0 \\ 0 & 0 & 0 & 0 & 0 \\ 1 & 0 & 0 & 0 & 1 \end{bmatrix} \times \frac{1}{4},$$

$$ClippingMask = \begin{bmatrix} 0 & 0 & 0 & 0 & 0 \\ 0 & 0 & 0 & 0 & 0 \\ 0 & 0 & 0 & 0 & 0 \\ 0 & 0 & 0 & 0 & 0 \\ 0 & 0 & 0 & 0 & 0 \end{bmatrix},$$

a resulting correction proportion = 1.

If only one top corner of pixel is clipped, a clipping mask may be expressed as follows:

$$ClippingMask = \begin{bmatrix} 1 & 1 & 1 & 0 & 0 \\ 1 & 1 & 1 & 0 & 0 \\ 0 & 0 & 0 & 0 & 0 \\ 0 & 0 & 0 & 0 & 0 \\ 0 & 0 & 0 & 0 & 0 \end{bmatrix},$$

a resulting correction proportion = 3/4.

According to an embodiment, high resolution IR interpolation 220 may apply a bandpass filter to green and IR pixel sample values to exploit inter-channel correlation to enable a more accurate and/or higher quality IR output 204. High resolution IR interpolation 220 may be implemented, in whole or in part, using features of system 400 shown in FIG. 5. IR interpolation 220 may set pixel sample values for red and blue pixels to a zero and/or null value. In a particular implementation mask 404 and/or mask 406 may be implemented, at least in part, using multiplexer circuits. In particular implementations, system 400 may reduce a number of operations of a Bayer invariant filter 414 in that at least a portion of inputs are zero if only a subset of channels is used.

Figure 5:
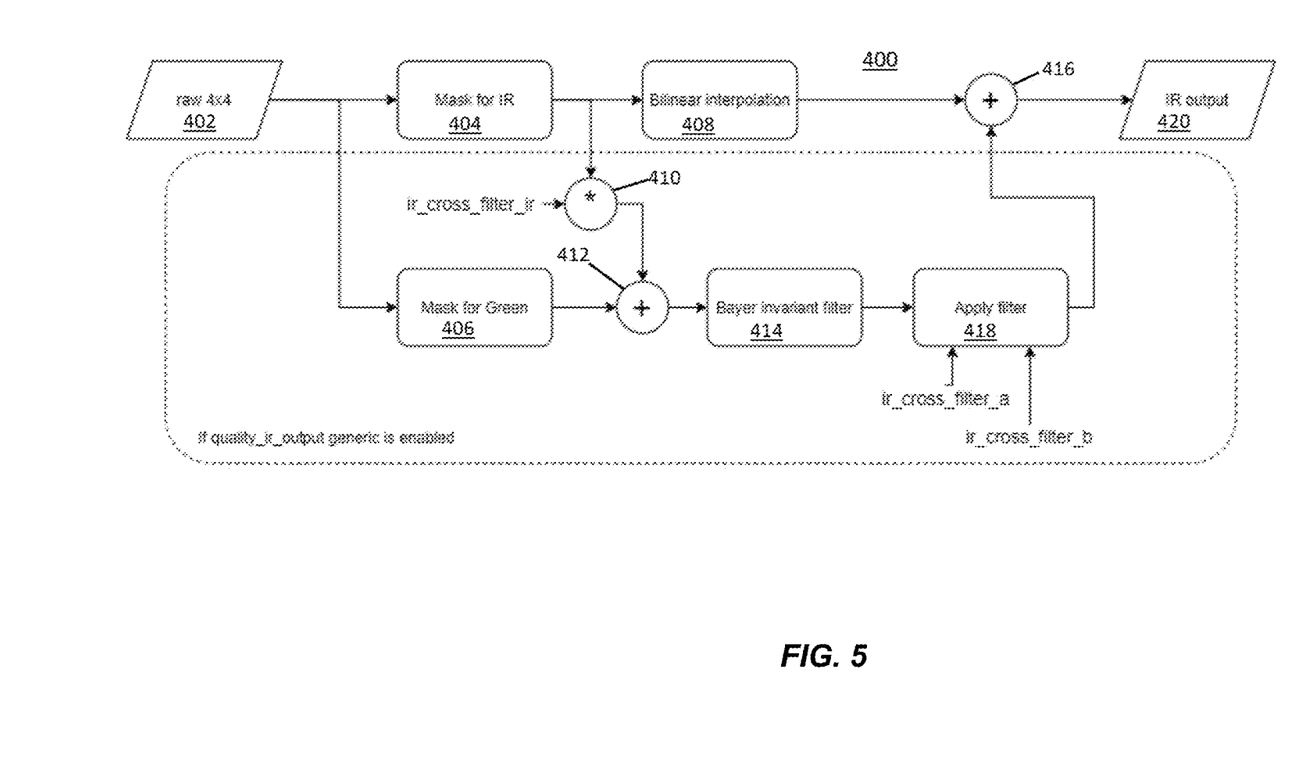
FIG. 5 is a schematic diagram of a system to interpolate a value of an infrared pixel based on an inter-channel correlation, according to an embodiment.

According to an embodiment, filter operation 418 may determine a correction to be applied to interpolated IR pixel values at adder 416. Such a correction may be based, at least in part, on a convolution of a 3×3 kernel applied to green pixel sample values provided by mask 406. In this context, a "kernel" as referred to herein means a set of organized parameters of a convolution operation to be applied to one or more image signal values expressing an image, such as color intensity values associated with pixel locations in the image, to impart a particular intended effect to the image. Such an intended effect may comprise, for example, blurring, sharpening, embossing, feature detection/extraction (e.g., edge detection), just to provide a few examples. In a particular implementation, a kernel may comprise an ordered array of values (e.g., coefficients in a fixed or floating point format) tailored for application to image signal intensity values of a particular dimensionality such as dimensions corresponding to color intensity values and/or pixel location. A 3×3 kernel may be expressed, for example, as a matrix K of cross-correlation coefficients a, b and c as follows:

$$K = \begin{matrix} a & b & a \\ b & c & b \\ a & b & a \end{matrix}$$

A convolution at block 418 may be determined according to expression (2) as follows:

$$\text{correction} = K * D, \quad (2)$$

where:
  \*is a convolution operation; and
  D is a matrix of values based, at least in part, on green pixel sample values as follows:

$$D = \begin{matrix} a1 & a2 & a3 \\ a4 & a5 & a6 \\ a7 & a8 & a9 \end{matrix}$$

It may be observed that that is based, at least in part, on inherent properties (e.g., symmetry) of the 3×3 kernel to be applied by Bayer invariant filter 414 a value for cross-correlation coefficient c in matrix D may be expressed in terms of cross-correlation coefficients a and b according to expression (3) as follows:

$$c = -4(a+b) \quad (3)$$

As such, computation of a value for correction may be reduced to a computation using only two multiplication operations according to expression (4) as follows:

correction=$a \times (a1+a3+a7+a9) + b \times (a2+a4+a6+a8) + c \times a5$ correction=$a \times (a1+a3+a7+a9) + b \times (a2+a4+a6+a8) - 4 \times (a+b)a5$ correction=$a \times (a1+a3+a7+a9-4a5) + b \times (a2+a4+a6+a8-4a5)$. (4)

Figure 6:
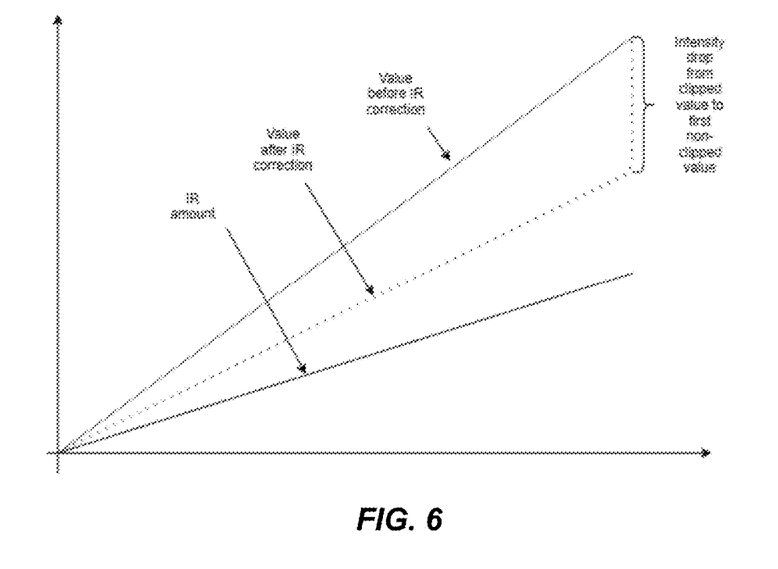
FIG. 6 is a plot illustrating a correction to a visual light pixel value to account for contributions from infrared light, according to an embodiment.

According to an embodiment, values for ir_cross_filter_a and if_cross_filter_b may be implemented as values for coefficients a and b, respectively. Additionally, an output value for block 418 to be combined with an output value for bilinear interpolation 408, may be determined based, at least in part, a computed value for correction as per expression (4). In some implementations, IR correction may be applied to interpolated red, blue and/or green pixel values that have been clipped (cutoff at and/or reduced to a maximum value). As such, application of an IR correction at IR correction 228 and/or IR correction 230 may overcorrect such clipped pixel values, possibly resulting in dark halos around edges of a reproduced image. One technique to correct this effect may include implementation of clipping masks for visible color pixels around edges. FIG. 6 is a plot illustrating a correction to be applied to a pixel value for a visual color channel to account for contributions of intensity from infrared light, according to an embodiment. Such a correction may be applied to interpolated red, blue and/or green pixel values at IR correction 228 and/or IR correction 230, for example. In an implementation, such corrections applied to interpolated red, blue and/or green pixel values may be expressed as a decrease in intensity to account for erroneous contributions of IR light energy. If such an interpolated red, blue and/or green pixel value is clipped prior to application of a correction at IR correction 228 or IR correction 230, for example, such a correction may overcorrect such a clipped interpolated pixel value to a lower intensity value. This may result, for example, in dark halos around edges of a reproduced image. For example, it may be observed that IR correction on clipped pixels may result in an intensity drop and, as such, a simple mask may introduce dark halos around edges. This may be at least partially addressed with proportional IR correction. In a particular implementation, brightness may be smoothly changed between non-clipped to clipped pixels. In one embodiment, IR correction may be applied to non-clipped pixels, but may not be applied to clipped pixels. By re-normalizing pixel values, a difference between before and correction may be relatively small to return an overall image closer to its brightness before correction.

In an alternative technique, according to an embodiment, such an overcorrected clipped interpolated pixel value may be renormalized to Value$_{Out}$ according to expression (5) as follows:

$$\text{Value}_{Out} = \frac{\text{Value}_{In(corrected)}}{\text{Value}_{max} - Ir} \times \text{Value}_{max}, \quad (5)$$

where: Value$_{In(corrected)}$ is an overcorrected clipped interpolated pixel value;

Value$_{max}$ is a maximum value that may be assumed for an interpolated pixel value; and $Ir$ is a linearized interpolated infrared pixel values (e.g., output signal of block 224, FIG. 2A).

Figure 7:
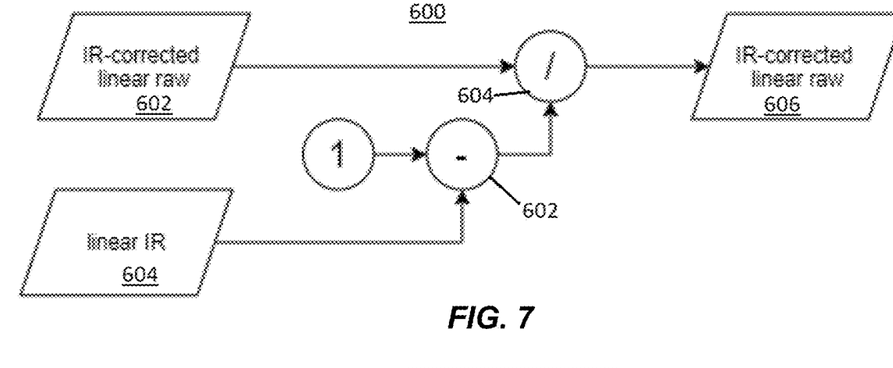
FIGS. 7 and 8 are schematic diagrams of system apply corrections to clipped pixel values, according to an embodiment.
Figure 8:
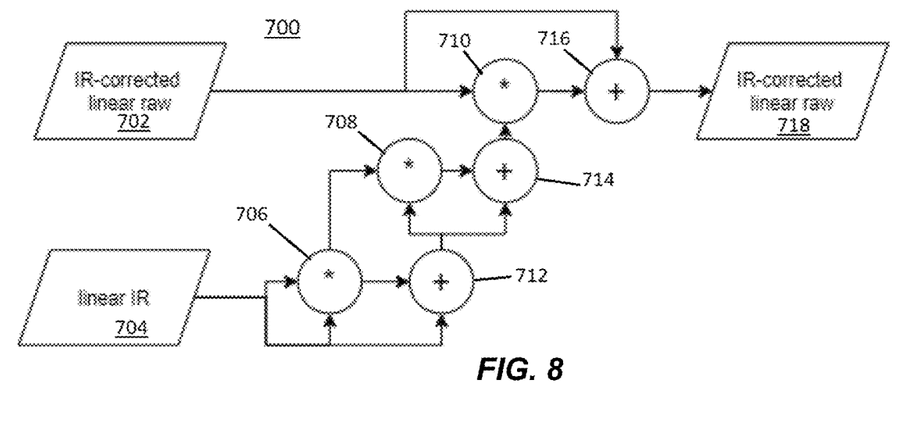

According to an embodiment, features of expression (5) may be implemented in circuitry according to system 600 shown in FIG. 7. It may be appreciated that implementation of a divider operation 604 may be computationally costly in terms of a number of transistors to implement divider 604 and/or in terms of power consumption. In an alternative embodiment, a renormalized value Value$_{Out}$ may be approximated using a Taylor series expansion to eliminate use of such a divider. Clipping management 234 may implement such an approximation for using all or a portion of circuit features of system 700 shown in FIG. 8. Computations performed by system 600 may be expressed according to expression (6) as follows raw_linear$_{new}$=raw_linear$_{old}$+raw_linear$_{old}$(s2+s3), (6)

where:
  s1=IR_linear×IR_linear: (e.g., output signal of multiplier 706);
  s2=s1+IR_linear: (e.g., output signal of adder 712);
  s3=s1s2: (e.g., output signal of multiplier 708).

In one embodiment, operations performed by system 700 may be carried out using floating point arithmetic. For example, multiplication circuits 706, 708 and/or 710 may implement shift registers to carry out multiplication operations. According to an embodiment, values for IR-corrected linear raw 602/702 and/or values for linear IR 604/704 may comprise values that are proportional to an amount of incident light (e.g., intensity, number of photons, etc.). In one particular implementation, values for IR-corrected linear raw 602/702 and/or values for linear IR 604/704 may be an increasing function of (e.g., substantially proportional to) a square root of an amount of incident light. Certain operations, such as interpolation, may be applied to such a square root of an amount of incident light. According to an embodiment, input signals for IR-corrected linear 602/702 and/or linear IR 604/704 may, at least in part, be provided by false color correction 232, which may receive an input signal from false colour detection 214.

According to an embodiment systems 200, 300, 400, 600 and/or 700 may be formed by and/or expressed in transistors and/or lower metal interconnects (not shown) in processes (e.g., front end-of-line and/or back-end-of-line processes) such as processes to form complementary metal oxide semiconductor (CMOS) circuitry, just as an example. It should be understood, however that this is merely an example of how circuitry may be formed in a device in a front end-of-line process, and claimed subject matter is not limited in this respect.

It should be noted that the various circuits disclosed herein may be described using computer aided design tools and expressed (or represented), as data and/or instructions embodied in various computer-readable media, in terms of their behavioral, register transfer, logic component, transistor, layout geometries, and/or other characteristics. Formats of files and other objects in which such circuit expressions may be implemented include, but are not limited to, formats supporting behavioral languages such as C, Verilog, and VHDL, formats supporting register level description languages like RTL, and formats supporting geometry description languages such as GDSII, GDSIII, GDSIV, CIF, MEBES and any other suitable formats and languages. Storage media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.).

If received within a computer system via one or more machine-readable media, such data and/or instruction-based expressions of the above described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process (e.g., wafer fabrication process).

In the context of the present patent application, the term "between" and/or similar terms are understood to include "among" if appropriate for the particular usage and vice-versa. Likewise, in the context of the present patent application, the terms "compatible with," "comply with" and/or similar terms are understood to respectively include substantial compatibility and/or substantial compliance.

For one or more embodiments, system 200 may be implemented in a device, such as a computing device and/or networking device, that may comprise, for example, any of a wide range of digital electronic devices, including, but not limited to, desktop and/or notebook computers, high-definition televisions, digital versatile disc (DVD) and/or other optical disc players and/or recorders, game consoles, satellite television receivers, cellular telephones, tablet devices, wearable devices, personal digital assistants, mobile audio and/or video playback and/or recording devices, Internet of Things (IoT) type devices, in-vehicle electronics or advanced driver-assistance systems (ADAS), or any combination of the foregoing. Further, unless specifically stated otherwise, a process as described, such as with reference to flow diagrams and/or otherwise, may also be executed and/or affected, in whole or in part, by a computing device and/or a network device. A device, such as a computing device and/or network device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, global positioning system (GPS) and/or other location-identifying type capability, and/or a display with a higher degree of functionality, such as a touch-sensitive color 2D or 3D display, for example.

In the context of the present patent application, the term "connection," the term "component" and/or similar terms are intended to be physical but are not necessarily always tangible. Whether or not these terms refer to tangible subject matter, thus, may vary in a particular context of usage. As an example, a tangible connection and/or tangible connection path may be made, such as by a tangible, electrical connection, such as an electrically conductive path comprising metal or other conductor, that is able to conduct electrical current between two tangible components. Likewise, a tangible connection path may be at least partially affected and/or controlled, such that, as is typical, a tangible connection path may be open or closed, at times resulting from influence of one or more externally derived signals, such as external currents and/or voltages, such as for an electrical switch. Non-limiting illustrations of an electrical switch include a transistor, a diode, etc. However, a "connection" and/or "component," in a particular context of usage, likewise, although physical, can also be non-tangible, such as a connection between a client and a server over a network, particularly a wireless network, which generally refers to the ability for the client and server to transmit, receive, and/or exchange communications, as discussed in more detail later.

In a particular context of usage, such as a particular context in which tangible components are being discussed, therefore, the terms "coupled" and "connected" are used in a manner so that the terms are not synonymous. Similar terms may also be used in a manner in which a similar intention is exhibited. Thus, "connected" is used to indicate that two or more tangible components and/or the like, for example, are tangibly in direct physical contact. Thus, using the previous example, two tangible components that are electrically connected are physically connected via a tangible electrical connection, as previously discussed. However, "coupled," is used to mean that potentially two or more tangible components are tangibly in direct physical contact. Nonetheless, "coupled" is also used to mean that two or more tangible components and/or the like are not necessarily tangibly in direct physical contact, but are able to co-operate, liaise, and/or interact, such as, for example, by being "optically coupled." Likewise, the term "coupled" is also understood to mean indirectly connected. It is further noted, in the context of the present patent application, since memory, such as a memory component and/or memory states, is intended to be non-transitory, the term physical, at least if used in relation to memory necessarily implies that such memory components and/or memory states, continuing with the example, are tangible.

Unless otherwise indicated, in the context of the present patent application, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular, "and/or" is also used to describe a plurality and/or some other combination of features, structures, characteristics, and/or the like. Likewise, the term "based on" and/or similar terms are understood as not necessarily intending to convey an exhaustive list of factors, but to allow for existence of additional factors not necessarily expressly described.

It is further noted that the terms "type" and/or "like," if used, such as with a feature, structure, characteristic, and/or the like, using "optical" or "electrical" as simple examples, means at least partially of and/or relating to the feature, structure, characteristic, and/or the like in such a way that presence of minor variations, even variations that might otherwise not be considered fully consistent with the feature, structure, characteristic, and/or the like, do not in general prevent the feature, structure, characteristic, and/or the like from being of a "type" and/or being "like," (such as being an "optical-type" or being "optical-like," for example) if the minor variations are sufficiently minor so that the feature, structure, characteristic, and/or the like would still be considered to be substantially present with such variations also present. Thus, continuing with this example, the terms optical-type and/or optical-like properties are necessarily intended to include optical properties. Likewise, the terms electrical-type and/or electrical-like properties, as another example, are necessarily intended to include electrical properties. It should be noted that the specification of the present patent application merely provides one or more illustrative examples and claimed subject matter is intended to not be limited to one or more illustrative examples; however, again, as has always been the case with respect to the specification of a patent application, particular context of description and/or usage provides helpful guidance regarding reasonable inferences to be drawn.

The term electronic file and/or the term electronic document are used throughout this document to refer to a set of stored memory states and/or a set of physical signals associated in a manner so as to thereby at least logically form a file (e.g., electronic) and/or an electronic document. That is, it is not meant to implicitly reference a particular syntax, format and/or approach used, for example, with respect to a set of associated memory states and/or a set of associated physical signals. If a particular type of file storage format and/or syntax, for example, is intended, it is referenced expressly. It is further noted an association of memory states, for example, may be in a logical sense and not necessarily in a tangible, physical sense. Thus, although signal and/or state components of a file and/or an electronic document, for example, are to be associated logically, storage thereof, for example, may reside in one or more different places in a tangible, physical memory, in an embodiment.

In the context of the present patent application, the terms "entry," "electronic entry," "document," "electronic document," "content", "digital content," "item," and/or similar terms are meant to refer to signals and/or states in a physical format, such as a digital signal and/or digital state format, e.g., that may be perceived by a user if displayed, played, tactilely generated, etc. and/or otherwise executed by a device, such as a digital device, including, for example, a computing device, but otherwise might not necessarily be readily perceivable by humans (e.g., if in a digital format). Likewise, in the context of the present patent application, digital content provided to a user in a form so that the user is able to readily perceive the underlying content itself (e.g., content presented in a form consumable by a human, such as hearing audio, feeling tactile sensations and/or seeing images, as examples) is referred to, with respect to the user, as "consuming" digital content, "consumption" of digital content, "consumable" digital content and/or similar terms. For one or more embodiments, an electronic document and/or an electronic file may comprise a Web page of code (e.g., computer instructions) in a markup language executed or to be executed by a computing and/or networking device, for example. In another embodiment, an electronic document and/or electronic file may comprise a portion and/or a region of a Web page. However, claimed subject matter is not intended to be limited in these respects.

Also, for one or more embodiments, an electronic document and/or electronic file may comprise a number of components. As previously indicated, in the context of the present patent application, a component is physical, but is not necessarily tangible. As an example, components with reference to an electronic document and/or electronic file, in one or more embodiments, may comprise text, for example, in the form of physical signals and/or physical states (e.g., capable of being physically displayed). Typically, memory states, for example, comprise tangible components, whereas physical signals are not necessarily tangible, although signals may become (e.g., be made) tangible, such as if appearing on a tangible display, for example, as is not uncommon. Also, for one or more embodiments, components with reference to an electronic document and/or electronic file may comprise a graphical object, such as, for example, an image, such as a digital image, and/or sub-objects, including attributes thereof, which, again, comprise physical signals and/or physical states (e.g., capable of being tangibly displayed). In an embodiment, digital content may comprise, for example, text, images, audio, video, and/or other types of electronic documents and/or electronic files, including portions thereof, for example.

Also, in the context of the present patent application, the term "parameters" (e.g., one or more parameters), "values" (e.g., one or more values), "symbols" (e.g., one or more symbols) "bits" (e.g., one or more bits), "elements" (e.g., one or more elements), "characters" (e.g., one or more characters), "numbers" (e.g., one or more numbers), "numerals" (e.g., one or more numerals) or "measurements" (e.g., one or more measurements) refer to material descriptive of a collection of signals, such as in one or more electronic documents and/or electronic files, and exist in the form of physical signals and/or physical states, such as memory states. For example, one or more parameters, values, symbols, bits, elements, characters, numbers, numerals or measurements, such as referring to one or more aspects of an electronic document and/or an electronic file comprising an image, may include, as examples, time of day at which an image was captured, latitude and longitude of an image capture device, such as a camera, for example, etc. In another example, one or more parameters, values, symbols, bits, elements, characters, numbers, numerals or measurements, relevant to digital content, such as digital content comprising a technical article, as an example, may include one or more authors, for example. Claimed subject matter is intended to embrace meaningful, descriptive parameters, values, symbols, bits, elements, characters, numbers, numerals or measurements in any format, so long as the one or more parameters, values, symbols, bits, elements, characters, numbers, numerals or measurements comprise physical signals and/or states, which may include, as parameter, value, symbol bits, elements, characters, numbers, numerals or measurements examples, collection name (e.g., electronic file and/or electronic document identifier name), technique of creation, purpose of creation, time and date of creation, logical path if stored, coding formats (e.g., type of computer instructions, such as a markup language) and/or standards and/or specifications used so as to be protocol compliant (e.g., meaning substantially compliant and/or substantially compatible) for one or more uses, and so forth.

Signal packet communications and/or signal frame communications, also referred to as signal packet transmissions and/or signal frame transmissions (or merely "signal packets" or "signal frames"), may be communicated between nodes of a network, where a node may comprise one or more network devices and/or one or more computing devices, for example. As an illustrative example, but without limitation, a node may comprise one or more sites employing a local network address, such as in a local network address space. Likewise, a device, such as a network device and/or a computing device, may be associated with that node. It is also noted that in the context of this patent application, the term "transmission" is intended as another term for a type of signal communication that may occur in any one of a variety of situations. Thus, it is not intended to imply a particular directionality of communication and/or a particular initiating end of a communication path for the "transmission" communication. For example, the mere use of the term in and of itself is not intended, in the context of the present patent application, to have particular implications with respect to the one or more signals being communicated, such as, for example, whether the signals are being communicated "to" a particular device, whether the signals are being communicated "from" a particular device, and/or regarding which end of a communication path may be initiating communication, such as, for example, in a "push type" of signal transfer or in a "pull type" of signal transfer. In the context of the present patent application, push and/or pull type signal transfers are distinguished by which end of a communications path initiates signal transfer.

Thus, a signal packet and/or frame may, as an example, be communicated via a communication channel and/or a communication path, such as comprising a portion of the Internet and/or the Web, from a site via an access node coupled to the Internet or vice-versa. Likewise, a signal packet and/or frame may be forwarded via network nodes to a target site coupled to a local network, for example. A signal packet and/or frame communicated via the Internet and/or the Web, for example, may be routed via a path, such as either being "pushed" or "pulled," comprising one or more gateways, servers, etc. that may, for example, route a signal packet and/or frame, such as, for example, substantially in accordance with a target and/or destination address and availability of a network path of network nodes to the target and/or destination address. Although the Internet and/or the Web comprise a network of interoperable networks, not all of those interoperable networks are necessarily available and/or accessible to the public. According to an embodiment, a signal packet and/or frame may comprise all or a portion of a "message" transmitted between devices. In an implementation, a message may comprise signals and/or states expressing content to be delivered to a recipient device. For example, a message may at least in part comprise a physical signal in a transmission medium that is modulated by content that is to be stored in a non-transitory storage medium at a recipient device, and subsequently processed.

In the context of the particular patent application, a network protocol, such as for communicating between devices of a network, may be characterized, at least in part, substantially in accordance with a layered description, such as the so-called Open Systems Interconnection (OSI) seven layer type of approach and/or description. A network computing and/or communications protocol (also referred to as a network protocol) refers to a set of signaling conventions, such as for communication transmissions, for example, as may take place between and/or among devices in a network. In the context of the present patent application, the term "between" and/or similar terms are understood to include "among" if appropriate for the particular usage and vice-versa. Likewise, in the context of the present patent application, the terms "compatible with," "comply with" and/or similar terms are understood to respectively include substantial compatibility and/or substantial compliance.

A network protocol, such as protocols characterized substantially in accordance with the aforementioned OSI description, has several layers. These layers are referred to as a network stack. Various types of communications (e.g., transmissions), such as network communications, may occur across various layers. A lowest level layer in a network stack, such as the so-called physical layer, may characterize how symbols (e.g., bits and/or bytes) are communicated as one or more signals (and/or signal samples) via a physical medium (e.g., twisted pair copper wire, coaxial cable, fiber optic cable, wireless air interface, combinations thereof, etc.). Progressing to higher-level layers in a network protocol stack, additional operations and/or features may be available via engaging in communications that are substantially compatible and/or substantially compliant with a particular network protocol at these higher-level layers. For example, higher-level layers of a network protocol may, for example, affect device permissions, user permissions, etc.

Figure 10:
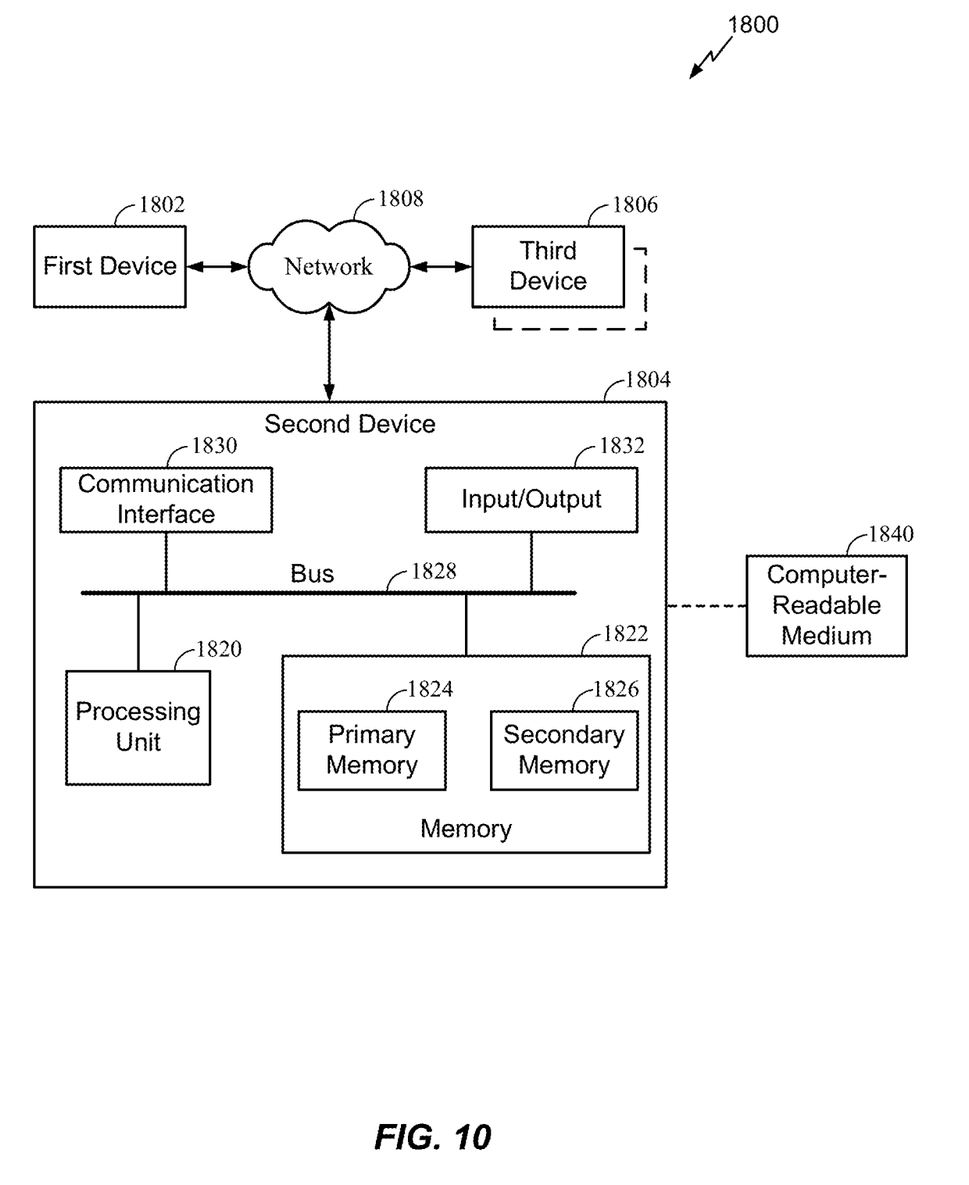
FIG. 10 is a schematic diagram of a computing system, according to an embodiment.

In one example embodiment, as shown in FIG. 10, a system embodiment may comprise a local network (e.g., device 1804 and medium 1840) and/or another type of network, such as a computing and/or communications network. For purposes of illustration, therefore, FIG. 10 shows an embodiment 1800 of a system that may be employed to implement either type or both types of networks. Network 1808 may comprise one or more network connections, links, processes, services, applications, and/or resources to facilitate and/or support communications, such as an exchange of communication signals, for example, between a computing device, such as 1802, and another computing device, such as 1806, which may, for example, comprise one or more client computing devices and/or one or more server computing device. By way of example, but not limitation, network 1808 may comprise wireless and/or wired communication links, telephone and/or telecommunications systems, Wi-Fi networks, Wi-MAX networks, the Internet, a local area network (LAN), a wide area network (WAN), or any combinations thereof.

Example devices in FIG. 10 may comprise features, for example, of a client computing device and/or a server computing device, in an embodiment. It is further noted that the term computing device, in general, whether employed as a client and/or as a server, or otherwise, refers at least to a processor and a memory connected by a communication bus. A "processor" and/or "processing circuit" for example, is understood to connote a specific structure such as a central processing unit (CPU), digital signal processor (DSP), graphics processing unit (GPU) and/or neural network processing unit (NPU), or a combination thereof, of a computing device which may include a control unit and an execution unit. In an aspect, a processor and/or processing circuit may comprise a device that fetches, interprets and executes instructions to process input signals to provide output signals. As such, in the context of the present patent application at least, this is understood to refer to sufficient structure within the meaning of 35 USC § 112 (f) so that it is specifically intended that 35 USC § 112 (f) not be implicated by use of the term "computing device," "processor," "processing unit," "processing circuit" and/or similar terms; however, if it is determined, for some reason not immediately apparent, that the foregoing understanding cannot stand and that 35 USC § 112 (f), therefore, necessarily is implicated by the use of the term "computing device" and/or similar terms, then, it is intended, pursuant to that statutory section, that corresponding structure, material and/or acts for performing one or more functions be understood and be interpreted to be described at least in FIG. 2A through FIG. 9G and in the text associated with the foregoing figure(s) of the present patent application.

Referring now to FIG. 10, in an embodiment, first and third devices 1802 and 1806 may be capable of rendering a graphical user interface (GUI) for a network device and/or a computing device, for example, so that a user-operator may engage in system use. Device 1804 may potentially serve a similar function in this illustration. Likewise, in FIG. 10, computing device 1802 ('first device' in figure) may interface with computing device 1804 ('second device' in figure), which may, for example, also comprise features of a client computing device and/or a server computing device, in an embodiment. Processor (e.g., processing device) 1820 and memory 1822, which may comprise primary memory 1824 and secondary memory 1826, may communicate by way of a communication bus 1815, for example. The term "computing device," in the context of the present patent application, refers to a system and/or a device, such as a computing apparatus, that includes a capability to process (e.g., perform computations) and/or store digital content, such as electronic files, electronic documents, measurements, text, images, video, audio, etc. in the form of signals and/or states. Thus, a computing device, in the context of the present patent application, may comprise hardware, software, firmware, or any combination thereof (other than software per se). Computing device 1804, as depicted in FIG. 10, is merely one example, and claimed subject matter is not limited in scope to this particular example. FIG. 10 may further comprise a communication interface 1830 which may comprise circuitry and/or devices to facilitate transmission of messages between second device 1804 and first device 1802 and/or third device 1806 in a physical transmission medium over network 1808 using one or more network communication techniques identified herein, for example. In a particular implementation, communication interface 1830 may comprise a transmitter device including devices and/or circuitry to modulate a physical signal in physical transmission medium according to a particular communication format based, at least in part, on a message that is intended for receipt by one or more recipient devices. Similarly, communication interface 1830 may comprise a receiver device comprising devices and/or circuitry demodulate a physical signal in a physical transmission medium to, at least in part, recover at least a portion of a message used to modulate the physical signal according to a particular communication format. In a particular implementation, communication interface may comprise a transceiver device having circuitry to implement a receiver device and transmitter device.

For one or more embodiments, a device, such as a computing device and/or networking device, may comprise, for example, any of a wide range of digital electronic devices, including, but not limited to, desktop and/or notebook computers, high-definition televisions, digital versatile disc (DVD) and/or other optical disc players and/or recorders, game consoles, satellite television receivers, cellular telephones, tablet devices, wearable devices, personal digital assistants, mobile audio and/or video playback and/or recording devices, Internet of Things (IoT) type devices, or any combination of the foregoing. Further, unless specifically stated otherwise, a process as described, such as with reference to flow diagrams and/or otherwise, may also be executed and/or affected, in whole or in part, by a computing device and/or a network device. A device, such as a computing device and/or network device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, GNSS receiver and/or other location-identifying type capability, and/or a display with a higher degree of functionality, such as a touch-sensitive color 5D or 3D display, for example.

In FIG. 10, computing device 1802 may provide one or more sources of executable computer instructions in the form physical states and/or signals (e.g., stored in memory states), for example. Computing device 1802 may communicate with computing device 1804 by way of a network connection, such as via network 1808, for example. As previously mentioned, a connection, while physical, may not necessarily be tangible. Although computing device 1804 of FIG. 10 shows various tangible, physical components, claimed subject matter is not limited to a computing devices having only these tangible components as other implementations and/or embodiments may include alternative arrangements that may comprise additional tangible components or fewer tangible components, for example, that function differently while achieving similar results. Rather, examples are provided merely as illustrations. It is not intended that claimed subject matter be limited in scope to illustrative examples.

Memory 1822 may comprise any non-transitory storage mechanism. Memory 1822 may comprise, for example, primary memory 1824 and secondary memory 1826, additional memory circuits, mechanisms, or combinations thereof may be used. Memory 1822 may comprise, for example, random access memory, read only memory, etc., such as in the form of one or more storage devices and/or systems, such as, for example, a disk drive including an optical disc drive, a tape drive, a solid-state memory drive, etc., just to name a few examples.

Memory 1822 may be utilized to store a program of executable computer instructions. For example, processor 1820 may fetch executable instructions from memory and proceed to execute the fetched instructions. Memory 1822 may also comprise a memory controller for accessing device readable-medium 1840 that may carry and/or make accessible digital content, which may include code, and/or instructions, for example, executable by processor 1820 and/or some other device, such as a controller, as one example, capable of executing computer instructions, for example. Under direction of processor 1820, a non-transitory memory, such as memory cells storing physical states (e.g., memory states), comprising, for example, a program of executable computer instructions, may be executed by processor 1820 and able to generate signals to be communicated via a network, for example, as previously described. Generated signals may also be stored in memory, also previously suggested.

Memory 1822 may store electronic files and/or electronic documents, such as relating to one or more users, and may also comprise a computer-readable medium that may carry and/or make accessible content, including code and/or instructions, for example, executable by processor 1820 and/or some other device, such as a controller, as one example, capable of executing computer instructions, for example. As previously mentioned, the term electronic file and/or the term electronic document are used throughout this document to refer to a set of stored memory states and/or a set of physical signals associated in a manner so as to thereby form an electronic file and/or an electronic document. That is, it is not meant to implicitly reference a particular syntax, format and/or approach used, for example, with respect to a set of associated memory states and/or a set of associated physical signals. It is further noted an association of memory states, for example, may be in a logical sense and not necessarily in a tangible, physical sense. Thus, although signal and/or state components of an electronic file and/or electronic document, are to be associated logically, storage thereof, for example, may reside in one or more different places in a tangible, physical memory, in an embodiment.

Algorithmic descriptions and/or symbolic representations are examples of techniques used by those of ordinary skill in the signal processing and/or related arts to convey the substance of their work to others skilled in the art. An algorithm is, in the context of the present patent application, and generally, is considered to be a self-consistent sequence of operations and/or similar signal processing leading to a desired result. In the context of the present patent application, operations and/or processing involve physical manipulation of physical quantities. Typically, although not necessarily, such quantities may take the form of electrical and/or magnetic signals and/or states capable of being stored, transferred, combined, compared, processed and/or otherwise manipulated, for example, as electronic signals and/or states making up components of various forms of digital content, such as signal measurements, text, images, video, audio, etc.

It has proven convenient at times, principally for reasons of common usage, to refer to such physical signals and/or physical states as bits, values, elements, parameters, symbols, characters, terms, samples, observations, weights, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically in the form of physical electronic and/or magnetic quantities, within memories, registers, and/or other storage devices, processing devices, and/or display devices of the special purpose computer and/or similar special purpose computing and/or network device. In the context of this particular patent application, as mentioned, the term "specific apparatus" therefore includes a general purpose computing and/or network device, such as a general purpose computer, once it is programmed to perform particular functions, such as pursuant to program software instructions.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation. Likewise, a physical change may comprise a transformation in molecular structure, such as from crystalline form to amorphous form or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state from a binary one to a binary zero or vice-versa in a memory device may comprise a transformation, such as a physical, but non-transitory, transformation. Rather, the foregoing is intended as illustrative examples.

Referring again to FIG. 10, processor 1820 may comprise one or more circuits, such as digital circuits, to perform at least a portion of a computing procedure and/or process. By way of example, but not limitation, processor 1820 may comprise one or more processors, such as controllers, microprocessors, microcontrollers, application specific integrated circuits, digital signal processors (DSPs), graphics processing units (GPUs), neural network processing units (NPUs), programmable logic devices, field programmable gate arrays, the like, or any combination thereof. In various implementations and/or embodiments, processor 1820 may perform signal processing, typically substantially in accordance with fetched executable computer instructions, such as to manipulate signals and/or states, to construct signals and/or states, etc., with signals and/or states generated in such a manner to be communicated and/or stored in memory, for example.

FIG. 10 also illustrates device 1804 as including a component 1832 operable with input/output devices, for example, so that signals and/or states may be appropriately communicated between devices, such as device 1804 and an input device and/or device 1804 and an output device. A user may make use of an input device, such as a computer mouse, stylus, track ball, keyboard, and/or any other similar device capable of receiving user actions and/or motions as input signals. Likewise, for a device having speech to text capability, a user may speak to a device to generate input signals. A user may make use of an output device, such as a display, a printer, etc., and/or any other device capable of providing signals and/or generating stimuli for a user, such as visual stimuli, audio stimuli and/or other similar stimuli.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. A method comprising:
   determining an interpolated pixel value based, at least in part, on a plurality of infrared pixel values;
   reducing a correction value to the interpolated pixel value based, at least in part, on relative magnitudes of one or more clipped interpolated pixel values; and
   applying a correction to the interpolated pixel value based, at least in part, on the reduced correction value.

2. The method of claim 1, wherein the interpolated pixel value is unclipped.

3. The method of claim 1, wherein applying the correction to the interpolated pixel value further comprises:
   blurring a clipped interpolated clipped infrared pixel value; and
   subtracting the reduced correction value from the blurred clipped interpolated infrared pixel value.

4. The method of claim 1, wherein the interpolated pixel value is associated with an intensity in a red, blue or green color channel of a multi color channel imaging system.

5. The method of claim 1, the method further comprising:
   renormalizing at least some of the corrected pixel values according to a maximum output value of a multi color channel imaging device and amount of infrared correction in the interpolated pixel value.

6. The method of claim 5, wherein renormalizing a corrected pixel value comprises approximating a ratio of the corrected pixel value to a normalization value using a Taylor series.

7. The method of claim 5, wherein renormalizing a corrected pixel value comprises approximating a ratio of the corrected pixel value to a normalization value based, at least in part, on application of a plurality of multiplication circuits independent of any division circuits.

8. The method of claim 7, wherein the plurality of multiplication circuits are adapted to operate in a floating point domain, and wherein at least one of the multiplication circuits implements a multiplication operation using a shift register.

9. The method of claim 1, and further comprising:
   determining an interpolated infrared pixel value based, at least in part, on raw pixel sample values obtained from a multi color channel imaging device and application of the correction value, the correction value being further computed based, at least in part, on raw pixel values in one or more color channels other than an infrared color channel according to a convolution of pixel values of one of the one or more color channels with a 3×3 kernel, the convolution comprising application of two filter coefficients reduced from three coefficients of the 3×3 kernel.

10. The method of claim 9, wherein the two filter coefficients reduced from three coefficients of the 3×3 kernel are selected from first and second coefficients of the 3×3 kernel, and wherein a third coefficient of the 3×3 kernel is derived from a linear combination of the first and second coefficients of the 3×3 kernel.

11. The method of claim 9, wherein the convolution further comprises application of a bandpass filter.

12. The method of claim 9, wherein the raw pixel sample values are derived from a green channel of a multi color channel imaging device.

13. A device comprising:
   circuitry to determine an interpolated pixel value based, at least in part, on a plurality of raw infrared pixel values;
   circuitry to reduce a correction value to the interpolated pixel value based, at least in part, on relative magnitudes of one or more clipped interpolated pixel values; and
   circuitry to apply a correction to the interpolated pixel value based, at least in part, on the reduced correction value.

14. The device of claim 13, wherein the interpolated pixel value is unclipped.

15. An article comprising:
   a non-transitory storage medium comprising computer-readable instructions stored thereon that are executable by one or more processors of a computing device to:
   determine an interpolated pixel value based, at least in part, on a plurality of infrared pixel values;
   reduce a correction value to the interpolated pixel value based, at least in part, on relative magnitudes of one or more clipped interpolated pixel values; and
   apply a correction to the interpolated pixel value based, at least in part, on the reduced correction value.

16. The article of claim 15, wherein the instructions are further executable by the one or more processors to:
   blur a clipped interpolated infrared pixel value; and
   subtract the reduced correction value from the blurred clipped interpolated infrared pixel value to at least in part apply the correction.

17. The article of claim 15, wherein the interpolated pixel value is associated with an intensity in a red, blue or green color channel of a multi color channel imaging system.

18. An article comprising:
   a non-transitory storage medium comprising computer-readable instructions stored thereon that are executable by one or more processors of a computing device to:
   express a circuit, to be formed in a circuit device, to determine an interpolated pixel value based, at least in part, on a plurality of infrared pixel values;
   express a circuit, to be formed in the circuit device, to reduce a correction value to the interpolated pixel value based, at least in part, on relative magnitudes of one or more clipped interpolated pixel values; and
   express a circuit, to be formed in the circuit device, to apply a correction to the interpolated pixel value based, at least in part, on the reduced correction value.

* * * * *